US009610994B2

(12) United States Patent
Peterson et al.

(10) Patent No.: US 9,610,994 B2
(45) Date of Patent: Apr. 4, 2017

(54) BICYCLE ILLUMINATION SYSTEM

(71) Applicants: Brian Peterson, Miami, FL (US);
Michael Peterson, Miami, FL (US);
Sean Peterson, Miami, FL (US)

(72) Inventors: Brian Peterson, Miami, FL (US);
Michael Peterson, Miami, FL (US);
Sean Peterson, Miami, FL (US)

( * ) Notice: Subject to any disclaimer, the term of this patent is extended or adjusted under 35 U.S.C. 154(b) by 0 days.

(21) Appl. No.: 14/729,875

(22) Filed: Jun. 3, 2015

(65) Prior Publication Data
US 2016/0355227 A1 Dec. 8, 2016

(51) Int. Cl.
B62K 19/40 (2006.01)
B62J 6/00 (2006.01)

(52) U.S. Cl.
CPC ............... B62J 6/003 (2013.01); B62K 19/40 (2013.01)

(58) Field of Classification Search
CPC .......... B62K 19/40; B62K 19/30; B62K 7/04; F21W 2101/023; F21Y 2103/003
See application file for complete search history.

(56) References Cited

U.S. PATENT DOCUMENTS

| | | | | |
|---|---|---|---|---|
| 4,319,307 A * | 3/1982 | Turner | ................... | B62K 21/12 362/191 |
| 4,819,135 A * | 4/1989 | Padilla | ....................... | B62J 6/20 340/432 |
| 4,901,209 A * | 2/1990 | Nitz | ....................... | B62K 19/16 280/281.1 |
| 5,008,782 A * | 4/1991 | Murray | ...................... | B62J 6/00 362/249.01 |
| 5,103,382 A * | 4/1992 | Kondo | ................... | B60Q 1/302 362/249.04 |
| 6,158,881 A * | 12/2000 | Carne | ....................... | B62J 6/003 362/183 |
| 7,766,504 B1 * | 8/2010 | Holin | ....................... | F21S 9/035 362/178 |
| 7,931,392 B2 * | 4/2011 | Nagao | ..................... | B62K 25/08 362/473 |
| 7,997,775 B2 * | 8/2011 | Hurwitz | ............... | B60Q 1/2615 362/464 |
| 2003/0067782 A1 * | 4/2003 | Niezrecki | ................... | B62J 6/20 362/473 |
| 2004/0095776 A1 * | 5/2004 | Pisula | ........................ | B62J 6/00 362/473 |
| 2012/0051072 A1 * | 3/2012 | Yelverton | .................. | B62J 6/00 362/473 |

(Continued)

Primary Examiner — Julie Bannan
(74) Attorney, Agent, or Firm — Mark Terry

(57) ABSTRACT

A system for illuminating a bicycle having a frame comprising a plurality of tubular frame members wherein each frame member has a plurality of orifices. The orifices allow light rays to pass from inside each tubular frame member to outside each tubular frame member. Bulbs for emitting light are adapted to fit inside the tubular frame members and are conductively coupled to a power source. The power source is sized such that the power source fits inside a vertically situated tubular frame member. A planar platform, having a length in one direction that is less than the inside cross sectional diameter of the vertically aligned tubular frame member, is sized so that the platform fits inside the vertical tubular frame member. The platform supports the power source and is positioned such that the power source can be installed and removed by a user.

17 Claims, 3 Drawing Sheets

(56) References Cited

U.S. PATENT DOCUMENTS

2013/0033883 A1* 2/2013 Ward ................... B62J 6/02
                                                362/474
2013/0188335 A1* 7/2013 Marche ................ F21S 9/02
                                                362/103

* cited by examiner

BICYCLE ILLUMINATION SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to the field of bicycles, and more specifically to the field of bicycle safety.

BACKGROUND

Bicycles were introduced in the 19th century and now number over one billion worldwide. They are the principal means of transportation in many parts of the world. Consequently, there are millions of bicycles on the road in every country on Earth. Many individuals enjoy riding bicycles for long distances, and sometimes at high speeds. Today's composite material technology has resulted in lighter and faster bicycles, which facilitates bicycling at high speeds. Because of the increased speed, bicycle riding has become increasingly more dangerous.

It is common to see bicycles and bicycle riders involved in accidents with automobiles as well as with pedestrians. This is especially true at night time or in the dark. Often, the reason for said accidents is that the bicycle is not highly visible to the automobile driver or pedestrian. In the past, many individuals have used reflectors on bicycles and on the clothing of the riders, in order to appear more visible to others. But this solution has had limited success. While this is an improvement, said reflectors do not always make the bicycle as visible as necessary. For instance, reflectors may not be seen by an automobile driver at various angles. Another improvement in bicycle visibility that has been utilized in the past is the use of lights on the front of the bicycle. If an automobile is approaching from behind, however, a person is still unable to see the bicycle. Additionally, the use of a few reflectors may make it apparent to a driver that something is there, but it may still be difficult for an observer to determine exactly the type of object being viewed.

Another improvement in bicycle visibility is the utilization of multiple lights in the front and back of the bicycle. While this is also an improvement, this requires multiple battery sources and also increases the amount of purchases that a user is required to make. Additionally, this improvement requires a user to mount lights on multiple parts on the exterior of the bicycle, which may be lost or damaged when the bicycle accidentally or intentionally falls to the ground.

As a result, there exists a need for improvements over the prior art and more particularly for a more efficient way and safer way for a user of a bicycle to become more visible during the night.

SUMMARY

A system for illuminating a bicycle having a frame comprising a plurality of tubular frame members is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, the system comprises a plurality of orifices disposed on each of the plurality of tubular frame members. The orifices allow light rays to pass from inside each tubular frame member to outside each tubular frame member. The system includes a plurality of illuminating bulbs for emitting light, wherein the illuminating bulbs are adapted to fit inside the plurality of tubular frame members and wherein the bulbs are conductively coupled to a power source via an insulated wire. The power source comprises a plurality of batteries housed in a case. The batteries are conductively coupled, via insulated wire, to the plurality of light bulbs. The power source has a length in one direction that is less than an inside cross-sectional diameter of a vertically situated tubular frame member of the bicycle frame so that the power source fits inside the vertically situated tubular member. The system also includes a planar platform for supporting the power source within the frame. The platform has a length in one direction that is less than the inside cross sectional diameter of the vertically aligned tubular frame member so that the platform fits inside the vertical tubular frame member.

Additional aspects of the disclosed embodiment will be set forth in part in the description which follows, and in part will be obvious from the description, or may be learned by practice of the disclosed embodiments. The aspects of the disclosed embodiments will be realized and attained by means of the members and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1:
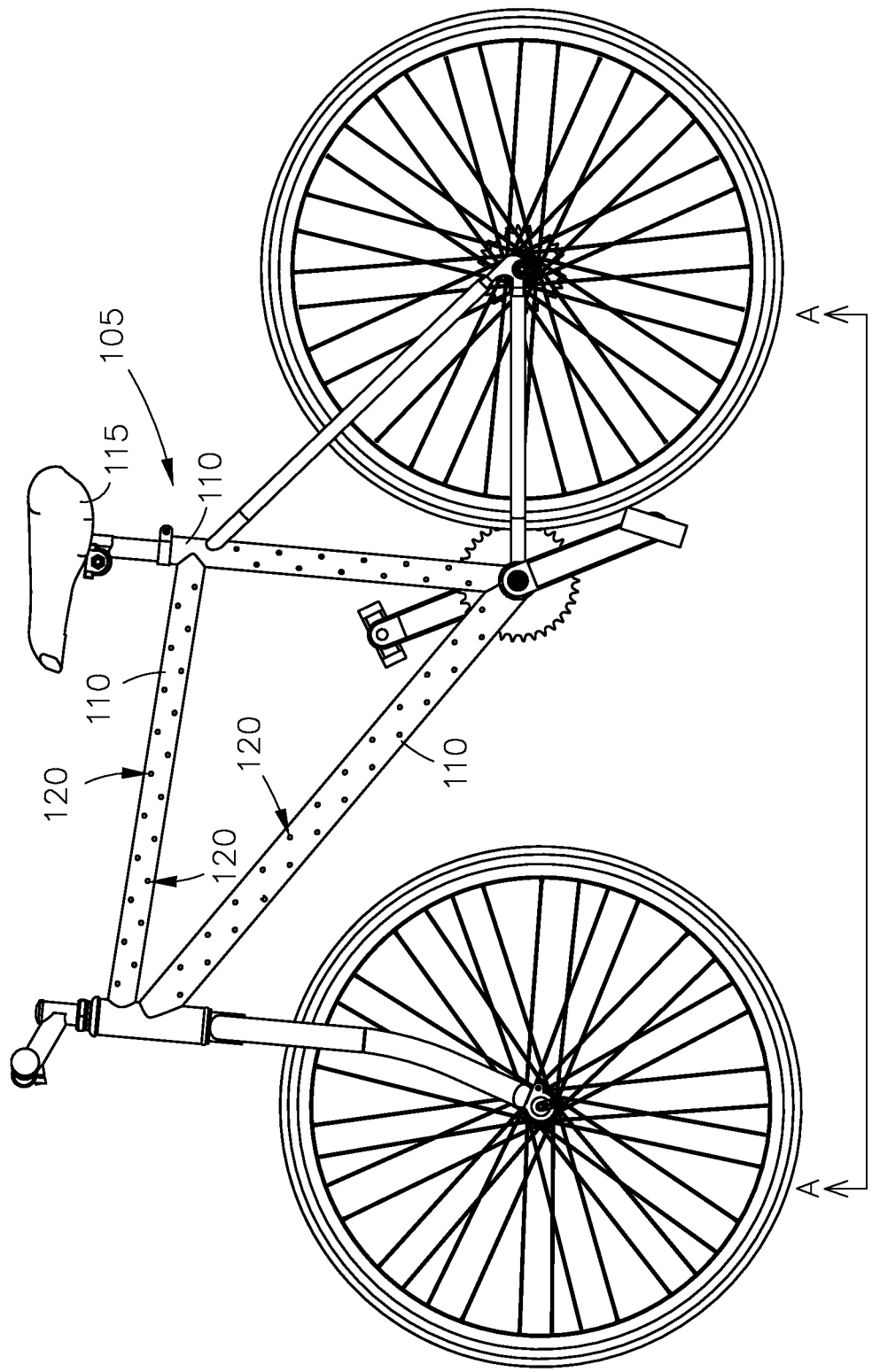
FIG. 1 is a side view of a bicycle utilizing a system for illuminating a bicycle having a frame comprising a plurality of tubular frame members, according to an example embodiment.

The following detailed description refers to the accompanying drawings. Whenever possible, the same reference numbers are used in the drawings and the following description to refer to the same or similar members. While disclosed embodiments may be described, modifications, adaptations, and other implementations are possible. For example, substitutions, additions or modifications may be made to the members illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a system a system for illuminating a bicycle frame comprising a plurality of tubular frame members. The system improves over the prior art by providing a system for illuminating a bicycle that allows an observer to clearly distinguish that the object is a bicycle, even at night or in low light conditions. Additionally, the system improves over the prior art by having all components of the system held inside of the plurality of tubular frame members of a bicycle, thereby protecting the system from falls or other traumatic events. Further, the system improves over the prior art by allowing a user to easily install the system, as well as to easily remove or replace the power source of the system, without requiring the use of tools. Lastly, the system improves over the prior art by leveraging the existence of the battery pack, and providing a charging port for other devices that require power to function, thereby increasing the usability of the system.

Referring now to the Figures, FIG. 1 is a side view of a bicycle 105 utilizing a system for illuminating a bicycle having a frame comprising a plurality of tubular frame members 110, according to an example embodiment. The tubular members of the bicycle are hollow inside defining a cavity adapted to receive components. Each of the tubular members can be made from material comprising steel, high performance alloys, aluminum alloys, titanium, carbon fiber, cardboard or even bamboo or any combinations thereof. Disposed along the tubular frame members are orifices 120 and a bicycle seat 115. Each of the orifices allow light to be transmitted between the inside cavity of the tubular frame member to the outside. As is more fully explained below, a plurality of lights (illustrated in FIG. 2) emanating light rays are installed inside of the plurality of tubular frame members and conductively connected to a power source so that light can emanate from inside of the tubular frame members to outside the bicycle allowing the light to be seen from the outside. The size of the orifices can be varied to increase the amount of light that moves between the inside and outside. The amount of orifices can be increased or decreased depending on the preference of the user. The orifices may be distributed evenly throughout the body of the tubular frame members or can be arranged in various patterns depending on the preference of the user. The orifices may also be deposed throughout the tubular frame members for allowing substantially equal distribution of light emitting from the frame members. Each of the orifices can be individually drilled into the tubular frame members using a drill bit. In other embodiments, each of the frame members can be formed from a mold adapted to form each of the orifices. Each of the plurality of frame members can be affixed by welding, fasteners, etc. and well known to those skilled in the art. It is also worth noting that the power source is installed inside of the tubular frame members. However, in other embodiments, the power source may be attached or coupled to various parts of the bicycle.

Figure 2:
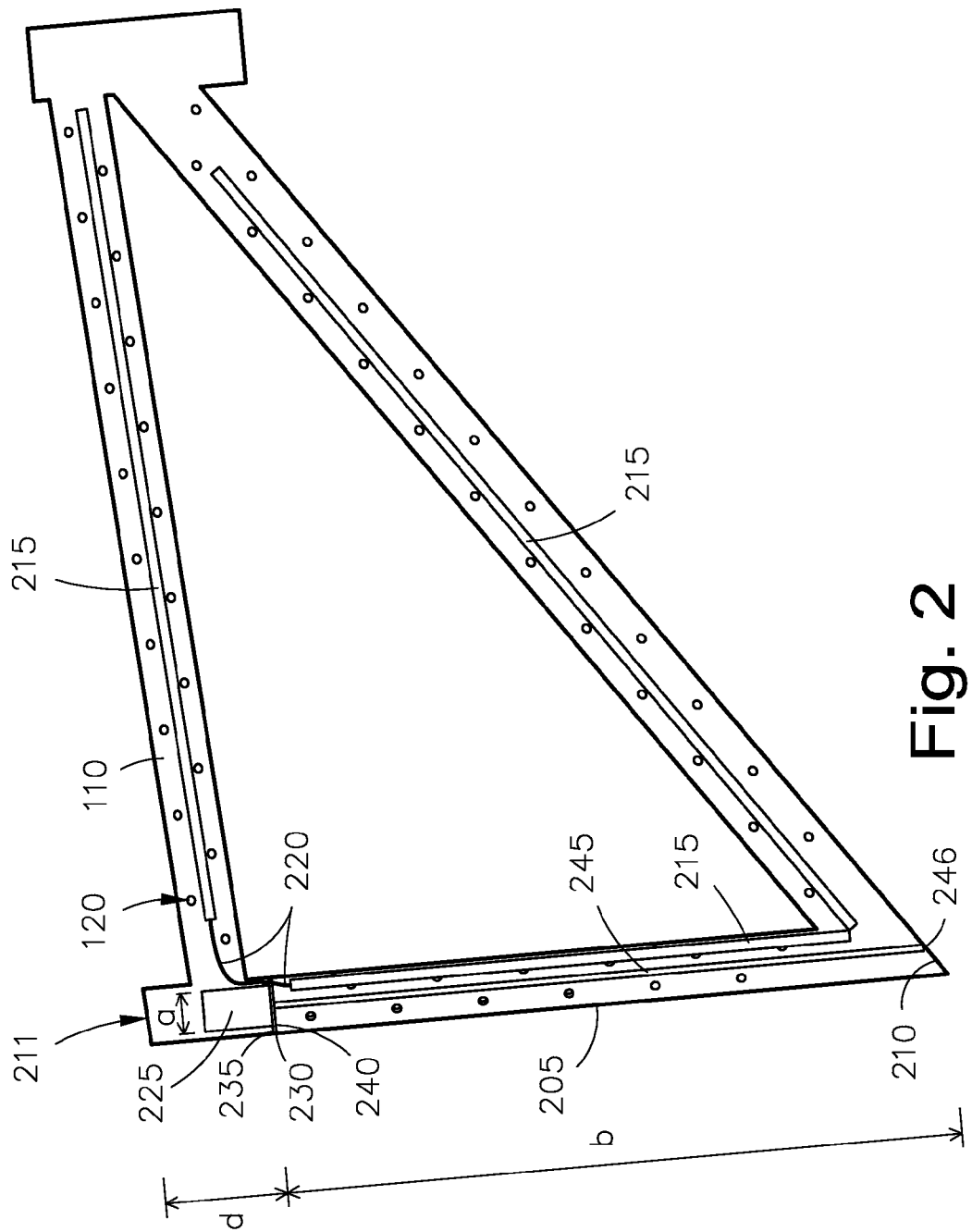
FIG. 2 is a cross sectional side view of tubular frame members, taken along line A of FIG. 1, illustrating the inside of the tubular frame members having the system held within.

FIG. 2 is a cross sectional side view of the tubular frame members, taken along line A, illustrating the inside of the tubular frame members having the system held within. This view allows the reader to view the components of the system held within the tubular frame members. A plurality of illuminating bulbs 215 for emanating light are installed within each tubular frame member. The lights are also sized and adapted to fit inside the tubular frame members. To install the lights, a user may desire to use a pull string (not shown) to manipulate the lights into place. The light emanating from the illuminating bulbs passes through the orifices of the tubular frame members and can be seen from the outside. The bulbs can be arranged as a string of lights conductively coupled with an insulated wire, and may also be an LED strip, an LED string, a lightbulb strip, a lightbulb string, etc. or any combinations thereof. The lights can be a variety of color combinations or can be adapted for changing colors or turning on and off at various intervals of time. The lights may change color or be adapted to have a certain color for allowing a user to demonstrate his or her patriotism for a particular team or purpose.

As mentioned above, the lights are connected to a removable power source 225 via an insulated cable or wire 220. Such wires and cables are well known to those skilled in the art. The power source is a battery pack housed in a case providing DC power to energize the light emitting bulbs. The DC power source may be a battery pack, a plurality of batteries, a single battery, rechargeable or not rechargeable, or any combination thereof. The case may be formed from material comprising plastic, leather, etc. and is well known to those skilled in the art. The power source has a length a in one direction that is less than the inside cross-sectional diameter of the vertically situated frame member 205 of the bicycle frame. The power source is sized such that it fits inside the vertically situated tubular member. In the present embodiment, the power source is cylindrically shaped, however other shapes may also be used and are within the spirit and scope of the present invention, as long as the power source is able to fit inside the vertically situated tubular member.

A planar platform 230 has a length in one direction that is also less than the inside cross-sectional diameter of the vertically aligned tubular frame member so that the platform fits inside the tubular frame member. The planar platform defines a top surface 235 opposing a bottom surface 240. The planar platform is for supporting the power source within the vertically aligned tubular frame member so that a user can install and remove the battery power source by hand with little difficulty. The platform may be comprised of materials such as plastic, fiberglass, metal, aluminum, graphite, etc. and such materials are well known to those skilled in the art.

In one embodiment, the platform is coupled to an inside surface of the frame member 205, such as via welding or via a fastener such as bolts. This allows the top surface of the platform to be positioned such that the power source supported by the platform within the tubular frame member can be installed and removed by the user through the top opening 211 of the vertically situated tubular frame member.

In another embodiment, the platform further comprises an elongated shaft 245 affixed to the bottom surface of the platform. The elongated shaft has a length having the dimension b so that the bottom end of the shaft 246 can stand on the inside surface 210 of the vertical tubular frame member and so that the top surface of the platform is positioned such that a power source supported by the platform within the tubular frame member can be installed and removed by the user through the top opening 211 of the vertically situated tubular frame member. The elongated shaft may be a fixed length or may have an adjustable length b. In one embodiment, the elongated shaft may be a telescoping shaft so that the length of the shaft may be adjusted so that the distance c from the top opening 211 of the vertically aligned tubular frame member to the top surface 235 of the platform is such that a user can remove the removable power source by hand. The elongated shaft may comprise of metal, alloy, carbon fiber, graphite, etc., which is well known to those skilled in the art.

FIG. 2 also shows a power port 290 located in the frame member 205 and a conductively coupled to the power source 225. The power port serves as an electrical interface between the power source and other computers or peripheral devices. In one embodiment, the port may be a female part of a connection. The port may be a specialized outlet to which a plug or cable connects. Electronically, the several conductors where the port and cable contacts connect, provide a method to transfer current and voltage, as well as signals. In one embodiment, the port is a USB port that may provide from about 0.5 to 5 Amps and about 5 to 20 Volts of power. In another embodiment, the port is an audio TRS connector.

Figure 3:
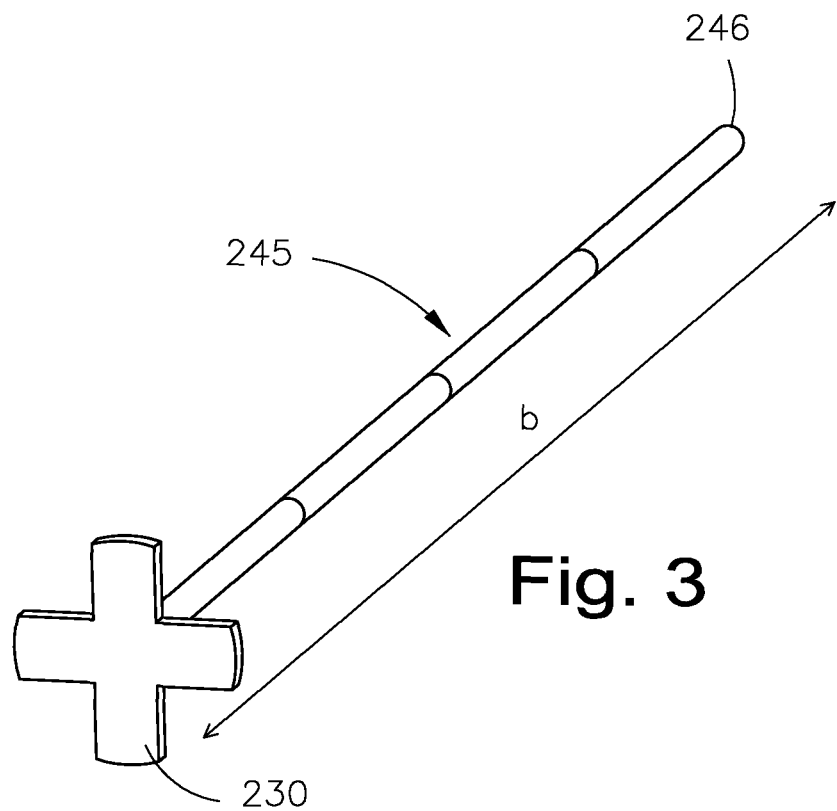
FIG. 3 is a perspective view of a platform and elongated shaft of the system; according to an example embodiment; and, FIG. 4 is a top view a vertically situated tubular frame member having the platform therein, according to an example embodiment.

FIG. 3 is a perspective view of a platform of the system, according to an example embodiment. The platform 230 has a circumference having a cross shape. The cross shape allows the planar body of the platform to support the battery source while at the same time allow wires and other components to pass by the platform. While the present embodiment is a cross shape, other shapes allowing wire and other components of the system to pass by the platform may also be used and are within the spirit and scope of the invention. The size of the cross should be such that the largest cross-sectional diameter of the cross is less than the inside cross-sectional diameter of the vertically aligned tubular shaped member. FIG. 3 also illustrates the elongated shaft 245. As mentioned above, the elongated shaft can be a telescoping shaft so that the length b may be adjusted. The shaft may also comprise multiple pieces that can be attached end to end until the desired length is attained.

Figure 4:
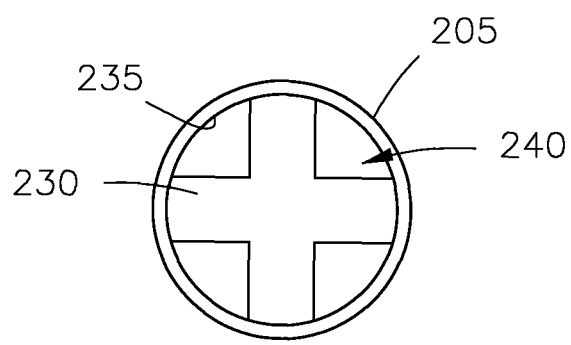

FIG. 4 is a top view a vertically situated tubular frame member 205 having the platform 230 therein, according to an example embodiment. As mentioned above the platform has a circumference that is adapted to fit within the inside of the vertically situated tubular frame member. In the present embodiment, the circumference defines a cross shape. As a result, the cross shape forms a plurality of openings 240 between the inside wall 235 of the vertical tubular frame member and the outside circumference of the platform. As a result, the wires and insulated bolts may pass through the openings for proper operation of the system. As mentioned above, other platform shapes may be used to allow insulated wires and bulbs to pass.

Referring to FIGS. 1-4, in operation, a user may install a string of lights or strip of lights, via a pull string, manipulation by hand, or otherwise, into the tubular shaped members of the bicycle. After installing the lights, the user may insert the platform with the elongated shaft attached to its bottom surface such that the bottom end of the shaft 246 stands on the bottom of the inside of the vertically aligned tubular shaped member. If necessary, a user may adjust the length of the elongated shaft so that the length l of the elongated shaft is such that the distance d from the top of the platform to the opening 211 is such that a user may install and remove a battery power source by hand. In other embodiments, a string may be attached to the top end of the case of the power source so that the battery may be more easily removed. Next, the user may connect or couple the terminals of the power source, using wires or cables, to the plurality of lights in order to provide power to the lights. In other embodiments, a user may choose to turn on or off the lights using a remote actuator or switch. Next, the user may install the seat 115 back onto the bicycle in order to operate or ride the bicycle. As light is transmitted through the orifices 120 of the tubular frame members, the frame is illuminated and the bicycle frame can be seen by others from the outside.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A system for illuminating a bicycle having a frame comprising a plurality of tubular frame members comprising:
   a plurality of orifices disposed on each of the plurality of tubular frame members, wherein the orifices allow exterior light rays to enter into each tubular frame member;
   a plurality of illuminating bulbs for emitting light, wherein the illuminating bulbs are adapted to fit inside the plurality of tubular frame members and wherein the bulbs are conductively coupled to a removable power source via an insulated wire;
   a removable power source comprising a plurality of batteries housed in a case, wherein the batteries are conductively coupled, via insulated wire, to the plurality of light bulbs, wherein the power source has a length in one direction that is less than an inside cross-sectional diameter of a vertically situated tubular frame member of the bicycle frame so that the power source fits inside the vertically situated tubular member; and,
   a planar platform having a length in one direction that is less than the inside cross sectional diameter of the vertically aligned tubular frame member so that the platform fits inside the vertical tubular frame member, wherein the platform supports the power source within the vertical tubular frame member, wherein the platform further comprises an elongated shaft affixed to a bottom surface of the platform, wherein the elongated shaft has an adjustable length so that a bottom end of the shaft stands on an inside surface of a bottom end of the vertical tubular shaped member, and wherein the length of the elongated shaft is adapted so that a top surface of the platform is positioned such that the power source supported by the platform within the vertical tubular frame member is configured for installation and removal by a hand of a user.

2. The system of claim 1, wherein the platform has a circumference having a cross shape forming a plurality of openings between an inside wall of the vertical tubular frame member and the circumference of the platform so that insulated wires and illuminating bulbs may pass through the openings.

3. The system of claim 1, where the plurality of illuminating bulbs are light emitting diode (LED) light bulbs.

4. The system of claim 1, wherein the plurality of illuminating bulbs are a string of light emitting diode (LED) lights.

5. The system of claim 1, wherein the illuminating bulbs emit light in a plurality of colors.

6. The system of claim 1, wherein the battery power source is a direct current (DC) power pack.

7. The system of claim 6, wherein the DC power source is rechargeable.

8. The system of claim 1, wherein the platform has a circumference sized such that at least one opening is formed between an inside wall of the vertical tubular frame member and the circumference of the platform so that insulated wires and illuminating bulbs may pass through the at least one opening.

9. The system of claim 1, wherein the orifices on each tubular frame member are disposed throughout the tubular frame member allowing for substantially equal distribution of light emitting from the frame member.

10. A system for illuminating a bicycle having a frame comprising a plurality of tubular frame members comprising:
    a plurality of orifices disposed on each of the plurality of tubular frame members, wherein the orifices allow external light rays to enter into each tubular frame member;
    a plurality of illuminating bulbs for emitting light, wherein the illuminating bulbs are adapted to fit inside the plurality of tubular frame members and wherein the bulbs are conductively coupled to a removable power source via an insulated wire;
    a removable power source comprising a plurality of batteries housed in a case, wherein the batteries are conductively coupled, via insulated wire, to the plurality of light bulbs, wherein the power source has a length in one direction that is less than an inside cross-sectional diameter of a vertically situated tubular frame member of the bicycle frame so that the power source fits inside the vertically situated tubular member;
    a power port located in one of the tubular frame members and conductively coupled to the power source so as to allow charging of a device plugged into said power port; and,
    a planar platform having a length in one direction that is less than the inside cross sectional diameter of the vertically aligned tubular frame member so that the platform fits inside the vertical tubular frame member, wherein the platform supports the power source within the vertical tubular frame member, wherein the platform further comprises an elongated shaft affixed to a bottom surface of the platform, wherein the elongated shaft has an adjustable length so that a bottom end of the shaft stands on an inside surface of a bottom end of the vertical tubular shaped member, and wherein the length of the elongated shaft is adapted so that a top surface of the platform is positioned such that a power source supported by the platform within the vertical tubular frame member is configured for installation and removal by a hand of a user.

11. The system of claim 10, wherein the platform has a circumference having a cross shape forming a plurality of openings between an inside wall of the vertical tubular frame member and the circumference of the platform so that insulated wires and illuminating bulbs may pass through the openings.

12. The system of claim 10, wherein the plurality of illuminating bulbs are a string of light emitting diode (LED) lights.

13. The system of claim 10, wherein the illuminating bulbs emit light in a plurality of colors.

14. The system of claim 10, wherein the battery power source is a direct current (DC) power pack.

15. The system of claim 14, wherein the DC power source is rechargeable.

16. The system of claim 10, wherein the platform has a circumference sized such that at least one opening is formed between an inside wall of the vertical tubular frame member and the circumference of the platform so that insulated wires and illuminating bulbs may pass through the at least one opening.

17. The system of claim 10, wherein the orifices on each tubular frame member are disposed throughout the tubular frame member allowing for substantially equal distribution of light emitting from the frame member.

* * * * *